US010444558B2

(12) United States Patent
Tan et al.

(10) Patent No.: US 10,444,558 B2
(45) Date of Patent: Oct. 15, 2019

(54) DISPLAY PANEL AND DISPLAY DEVICE

(71) Applicant: BOE TECHNOLOGY GROUP CO., LTD., Beijing (CN)

(72) Inventors: Jifeng Tan, Beijing (CN); Wei Wang, Beijing (CN); Yafeng Yang, Beijing (CN); Xiaochuan Chen, Beijing (CN); Jian Gao, Beijing (CN); Xinli Ma, Beijing (CN); Can Wang, Beijing (CN); Can Zhang, Beijing (CN); Xiandong Meng, Beijing (CN); Xianqin Meng, Beijing (CN); Dacheng Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/750,035

(22) PCT Filed: Jul. 31, 2017

(86) PCT No.: PCT/CN2017/095230
§ 371 (c)(1),
(2) Date: Feb. 2, 2018

(87) PCT Pub. No.: WO2018/076858
PCT Pub. Date: May 3, 2018

(65) Prior Publication Data
US 2019/0004365 A1    Jan. 3, 2019

(30) Foreign Application Priority Data
Oct. 28, 2016  (CN) .......................... 2016 1 0967046

(51) Int. Cl.
*G02F 1/1335*    (2006.01)
*G02F 1/1343*    (2006.01)
*F21V 8/00*      (2006.01)

(52) U.S. Cl.
CPC ...... *G02F 1/133504* (2013.01); *G02B 6/0011* (2013.01); *G02F 1/133524* (2013.01);
(Continued)

(58) Field of Classification Search
None
See application file for complete search history.

(56) References Cited

U.S. PATENT DOCUMENTS 5,299,289 A * 3/1994 Omae ............... G02F 1/133371
                                              348/E9.027
6,215,928 B1 * 4/2001 Friesem .................. G02F 1/025
                                              372/102

(Continued)

FOREIGN PATENT DOCUMENTS

CN        1175164 A       3/1998
CN      101149445 A       3/2008
(Continued)

OTHER PUBLICATIONS

Chinese office action dated May 2, 2017 for corresponding CN application No. 201610967046.X with English translation attached.
(Continued)

*Primary Examiner* — James A Dudek
(74) *Attorney, Agent, or Firm* — Nath, Goldberg & Meyer; Joshua B. Goldberg

(57) ABSTRACT

A display panel and a display device are disclosed and belong to the field of display technology. The display panel comprises a first substrate and a second substrate opposite to each other, a liquid crystal layer, a first electrode, and a second electrode between the first substrate and the second substrate, a waveguide layer between the first substrate and the liquid crystal layer, and a plurality of grating units which are combined with the liquid crystal layer and disposed in a same layer as the liquid crystal layer; wherein the first (Continued)

electrode and the second electrode are configured to adjust a refractive index of the liquid crystal layer by changing voltages applied thereto; and a coupling efficiency at which light is coupled out of the waveguide layer is determined according to a difference between a refractive index of the grating units and the refractive index of the liquid crystal layer.

15 Claims, 5 Drawing Sheets

(52) U.S. Cl.
CPC .. *G02F 1/133615* (2013.01); *G02F 1/134309* (2013.01); *G02F 1/133512* (2013.01); *G02F 2001/133565* (2013.01)

(56) References Cited

U.S. PATENT DOCUMENTS

| | | | | |
|---|---|---|---|---|
| 6,236,799 | B1* | 5/2001 | Huh | G02F 1/011 385/130 |
| 6,600,528 | B2 | 7/2003 | Colgan | G02F 1/133526 349/95 |
| 6,999,156 | B2* | 2/2006 | Chou | G02F 1/133553 349/196 |
| 7,024,094 | B2* | 4/2006 | Kimura | G02F 1/133621 385/129 |
| 7,343,064 | B2* | 3/2008 | Koyama | G02F 1/133553 349/193 |
| 10,114,225 | B2* | 10/2018 | Kim | G03H 1/0808 |
| 10,191,198 | B2* | 1/2019 | Hong | G02B 6/0031 |
| 2002/0018628 | A1* | 2/2002 | Kim | G02F 1/011 385/120 |
| 2005/0123265 | A1* | 6/2005 | Kimura | G02F 1/133621 385/147 |
| 2005/0237475 | A1* | 10/2005 | Chou | G02F 1/133553 349/198 |
| 2014/0293759 | A1* | 10/2014 | Taff | G02B 27/2292 368/239 |
| 2014/0300840 | A1* | 10/2014 | Fattal | G02F 1/133615 349/15 |
| 2015/0138486 | A1* | 5/2015 | Lee | G02F 1/29 349/62 |
| 2016/0209577 | A1* | 7/2016 | Ford | G02B 6/0036 |
| 2017/0299799 | A1* | 10/2017 | Fattal | G02B 6/005 |
| 2018/0252933 | A1* | 9/2018 | Wang | H04N 13/305 |
| 2018/0364505 | A1* | 12/2018 | Tan | G02F 1/1335 |
| 2019/0004324 | A1* | 1/2019 | Wang | G02B 27/22 |
| 2019/0011625 | A1* | 1/2019 | Wang | G02B 6/0031 |
| 2019/0011735 | A1* | 1/2019 | Tan | G02F 1/1334 |
| 2019/0025644 | A1* | 1/2019 | Tan | G02F 1/133602 |

FOREIGN PATENT DOCUMENTS

| | | |
|---|---|---|
| CN | 101329463 A | 12/2008 |
| CN | 102162936 A | 8/2011 |
| CN | 104076518 A | 10/2014 |
| CN | 106291943 A | 1/2017 |
| CN | 106292051 A | 1/2017 |
| CN | 106324898 A | 1/2017 |
| CN | 206096696 U | 4/2017 |
| JP | H09318942 A | 12/1997 |
| JP | 2006259132 A | 9/2006 |
| WO | 2014081415 A1 | 5/2014 |

OTHER PUBLICATIONS

International search report dated Oct. 19, 2017 for corresponding International application No. PCT/CN2017/095230 with English translation attached.
Search report dated Feb. 27, 2017 for corresponding application No. 201610967046.X.

* cited by examiner

DISPLAY PANEL AND DISPLAY DEVICE

CROSS-REFERENCE TO RELATED APPLICATIONS

This is a National Phase Application filed under 35 U.S.C. 371 as a national stage of PCT/CN2017/095230, filed Jul. 31, 2017, an application claiming benefit of Chinese Patent Application No. 201610967046.X, filed on Oct. 28, 2016, the contents of which are incorporated herein in their entirety by reference.

TECHNICAL FIELD

The present disclosure relates to the field of display technology, and particularly relates to a display panel and a display device.

BACKGROUND

In the field of display technology, a liquid crystal display device includes a backlight and a display panel. The display panel includes an array substrate and a color filter substrate provided opposite to each other, a liquid crystal layer is provided between the array substrate and the color filter substrate, and the array substrate and the color filter substrate each are provided with a polarizer on the back. Grayscale display is achieved through deflection of liquid crystals controlled by a voltage and control of the two polarizers.

The use of a polarizer in a display panel of a liquid crystal display device in the prior art may result in a low transmittance of the liquid crystal display device (for example, a transmittance of about 7%) and a large liquid crystal cell thickness (for example, 3 μm to 5 μm), and a large cell thickness may reduce a response speed of liquid crystals. Generally, color resistors are provided on the color filter substrate to realize color display, which may also cause the display panel to be thick.

SUMMARY

The present disclosure provides a display panel including: a first substrate and a second substrate disposed opposite to each other; a liquid crystal layer, a first electrode, and a second electrode between the first substrate and the second substrate; a waveguide layer between the first substrate and the liquid crystal layer; and a plurality of grating units, which are combined with the liquid crystal layer and disposed in a same layer as the liquid crystal layer, wherein the first electrode and the second electrode are configured to adjust a refractive index of the liquid crystal layer by changing voltages applied thereto; and a coupling efficiency at which light is coupled out of the waveguide layer is determined according to a difference between a refractive index of the grating units and the refractive index of the liquid crystal layer.

Optionally, the grating unit is an echelon grating, steps in the echelon grating have different heights from each other, and the grating unit is configured to perform color separation on light of different wavelengths through a stepped structure of the echelon grating.

Optionally, the grating unit is on a side of the liquid crystal layer proximal to the first substrate.

Optionally, the grating unit is on a side of the liquid crystal layer proximal to the second substrate.

Optionally, the first electrode and the second electrode are on one side of the liquid crystal layer.

Optionally, the first electrode and the second electrode are on different sides of the liquid crystal layer.

Optionally, the first electrode is on a side of the waveguide layer proximal to the first substrate; the grating unit is on a side of the waveguide layer distal to the first electrode; the liquid crystal layer is on a side of the grating unit distal to the waveguide layer; and the second electrode is on a side of the second substrate proximal to the liquid crystal layer.

Optionally, a refractive index of the waveguide layer is larger than a refractive index of the first electrode, and the refractive index of the first electrode is larger than or equal to the refractive index of the grating unit.

Optionally, the refractive index of the grating unit ranges from an ordinary refractive index $n_o$ of the liquid crystal layer to an extraordinary refractive index $n_e$ of the liquid crystal layer.

Optionally, a number of the steps of the echelon grating ranges from 3 to 100; the echelon grating has a width of 0.1 μm to 200 μm; each step of the echelon grating has a height of 0 μm to 300 μm; and the echelon grating has an imaging distance of 2 μm to 20 μm.

Optionally, the number of the steps of the echelon grating is 3, and the echelon grating is configured to disperse light into red light, green light and red light.

Optionally, a material of the liquid crystal layer comprises any one of a nematic liquid crystal, a cholesteric liquid crystal and a blue phase liquid crystal.

Optionally, a scattering film is provided on a side of the second substrate distal to the liquid crystal layer.

The present disclosure provides a display device, including a backlight and the display panel described above.

Optionally, the backlight is an edge type backlight, and is configured to provide collimated light.

Optionally, the display device further includes a light-shielding layer on a side of the display panel distal to the backlight.

DETAILED DESCRIPTION

To enable those skilled in the art to better understand technical solutions of the present disclosure, the present disclosure will be described in detail below in conjunction with the accompanying drawings and specific embodiments.

First Embodiment

Figure 1:
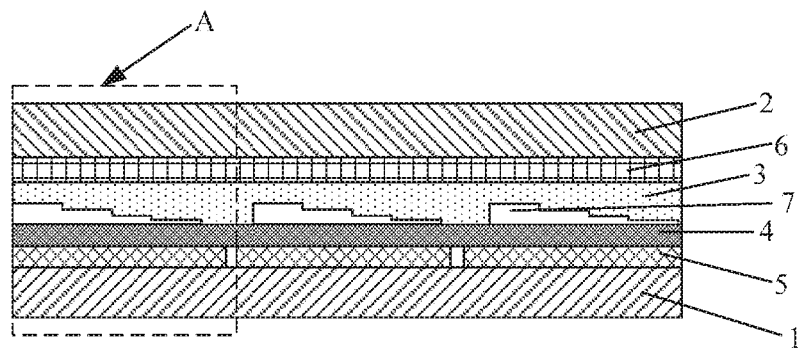
FIG. 1 is a schematic structural diagram of a display panel in a first embodiment of the present disclosure.
Figure 2:
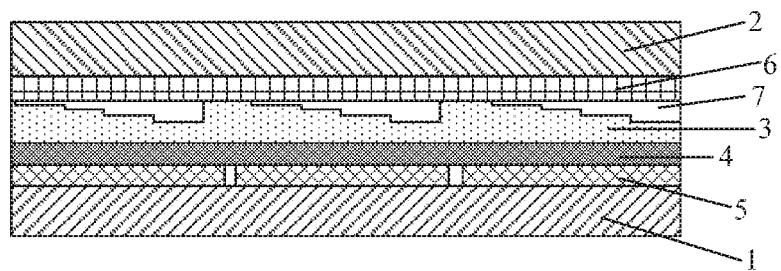
FIG. 2 is a schematic structural diagram of a display panel in the first embodiment of the present disclosure.

Referring to FIGS. 1 and 2, this embodiment provides a display panel including a first substrate 1 and a second substrate 2 that are provided opposite to each other, a liquid crystal layer 3, a first electrode 5 and a second electrode 6 that are provided between the first substrate 1 and the second substrate 2, a waveguide layer 4 that is provided between the first substrate 1 and the liquid crystal layer 3, and a plurality of grating units 7 that are combined with the liquid crystal layer 3 and are provided in the same layer as the liquid crystal layer 3. The first electrode and the second electrode are configured to adjust a refractive index of the liquid crystal layer by changing voltages applied thereto; and a coupling efficiency at which light is coupled out of the waveguide layer is determined according to a difference between a refractive index of the grating units and the refractive index of the liquid crystal layer.

In the embodiment, the first electrode 5 and the second electrode 6 configured to adjust the refractive index of the liquid crystal layer 3 by changing voltages applied thereto and one grating unit combined with the liquid crystal layer are included in an area of each pixel unit. For each pixel unit A, the refractive index of the liquid crystal layer 3 may be adjusted according to a difference between voltages applied to the first electrode 5 and the second electrode 6, and the coupling efficiency at which the waveguide layer 4 couples out light is determined according to the difference between the refractive indices of the liquid crystal layer 3 and the grating unit 7. Therefore, when the difference between the voltages applied to the first electrode 5 and the second electrode 6 is changed, a deflection angle of liquid crystals in the liquid crystal layer 3 is changed, and the liquid crystal layer 3 thus has a changed effective refractive index with respect to incident light, resulting in a change in the difference between the refractive indices of the liquid crystal layer 3 and the grating unit 7, which in turn results in a change in the coupling efficiency at which the waveguide layer 4 couples out light, that is, a displayed grayscale of the pixel unit A changes, so that each pixel unit A achieves display of different grayscales. At the same time, the grating unit 7 can disperse light into different colors, and thus the display panel in the present embedment can achieve color display without a color filter.

As shown in FIG. 1, the grating unit 7 in the present embodiment may be provided on a side of the liquid crystal layer 3 proximal to the first substrate 1, that is, the grating unit 7 is closer to the waveguide layer 4 than the liquid crystal layer 3, and in this case, the grating unit 7 can control the coupling efficiency at which light is coupled out from the waveguide layer 4. As shown in FIG. 2, the grating unit 7 may also be provided on a side of the liquid crystal layer 3 proximal to the second substrate 2, that is, the liquid crystal layer 3 is closer to the waveguide layer 4 than the grating unit 7.

Figure 3:
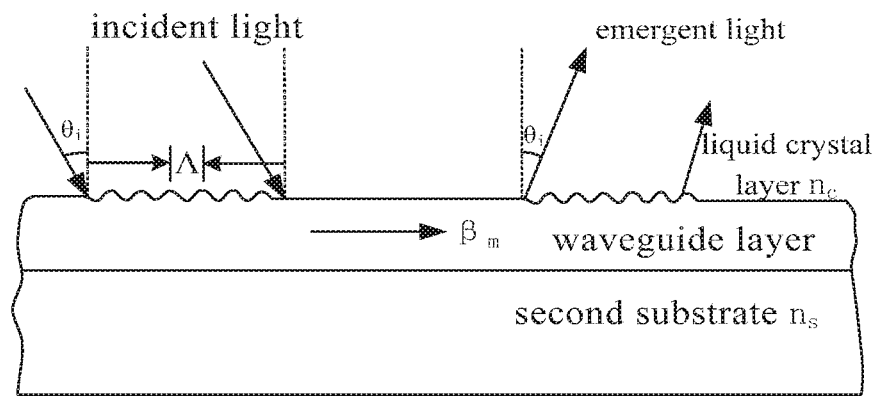
FIG. 3 is a schematic structural diagram illustrating a liquid crystal layer, a gating unit and a waveguide layer in a display panel forming a variable grating coupler according to the first embodiment of the present disclosure.

Specifically, no matter which one of the above-mentioned arrangements is adopted, as shown in FIG. 3, the liquid crystal layer 3, the grating unit 7 and the waveguide layer 4 can form a variable grating coupler, which can effectively couple light into or out of the waveguide layer 4. When incident light or emergent light satisfies a phase matching condition $\beta_q = \beta_m - qK$, $(q=0, \pm 1, \pm 2, \ldots)$, the incident light can excite m-th order guided mode or the m-th order guided mode can be coupled out in a given direction, where $\beta_q$ is the propagation constant of the incident light, $\beta_m$ is the propagation constant of the m-th order guided mode, q is the diffraction order, and K is a grating vector. Since $\beta_m = k_0 N_m$ and $K = 2\pi/\Lambda$, the above phase matching condition can be further expressed as $k_0 n_c \sin \theta_i = k_0 N_m - q 2\pi/\Lambda$, $(q=0, \pm 1, \pm 2, \ldots)$, where $k_0$ is $2\pi/\lambda$, $n_c$ is the refractive index of the liquid crystal layer 3, $\theta_i$ is an angle between a wave-vector direction of the incident light and a vertical direction, or an angle between a wave-vector direction of the emergent light and the vertical direction, $N_m$ is an effective refractive index of the m-th order guided mode, and $\Lambda$ is the period of the grating unit 7. It can be seen from the above phase matching condition that the grating unit 7 can control coupling efficiency at which light is coupled out of the waveguide layer 4 by changing the refractive index $n_c$ of the liquid crystal layer 3, and the coupling efficiency is related to the difference between the refractive indices of the liquid crystal layer 3 and the grating unit 7.

The first electrode 5 and the second electrode 6 in this embodiment are located on one side or on different sides of the liquid crystal layer 3. Optionally, the first electrode 5 is a pixel electrode and the second electrode 6 is a common electrode.

Specifically, the first electrode 5 and the second electrode 6 are located on different sides of the liquid crystal layer 3. The first electrode 5 is located on a side of the liquid crystal layer 3 proximal to the first substrate 1, and the second electrode 6 is located on a side of the liquid crystal layer 3 proximal to the second substrate 2. In this case, the display panel may be a twisted nematic (TN) type display panel, a vertical alignment (VA) type display panel, or an electronically controlled birefringence (ECB) display device.

Alternatively, the first electrode 5 and the second electrode 6 are located on one side of the liquid crystal layer 3. Both the first electrode 5 and the second electrode 6 are located at one side of the liquid crystal layer 3 proximal to the first substrate 1. In a case where the first electrode 5 and the second electrode 6 are located in different layers, the display panel may be an Advanced Super Dimension Switch (ADS) display panel. In a case where the first electrode 5 and the second electrode 6 are located in a single layer, the display panel may be an In-Plane Switching (IPS) display panel, which is not illustrated in detail herein. In practical applications, the display panel may also be a display panel of other type, which is not listed one by one herein.

A material of the liquid crystal layer 3 may be a nematic liquid crystal, a cholesteric liquid crystal or a blue phase liquid crystal. Preferably, TN type display panel, VA type display panel and ADS display panel are generally use a nematic liquid crystal. Preferably, the liquid crystal layer 3 has a thickness of 1 μm. The thickness of the liquid crystal layer 3 may be set flexibly as long as the liquid crystal layer 3 can cover the layer in which the grating units 7 are provided and setting of other parameters (e.g., electrical design, driving design, etc.) of a product is facilitated. The thickness of the liquid crystal layer 3 only needs to cover the thickness of the layer in which the grating units 7 are provided, therefore, the thickness of the liquid crystal layer 3 may be set to be very small, that is, a liquid crystal cell may be set to have a very small thickness, so as to further improve response speed of the liquid crystal.

A material of the grating unit 7 is a transparent dielectric material, such as $SiO_2$ or other organic resin. The refractive index of the grating unit 7 is in the range from the ordinary refractive index $n_o$ of the liquid crystal layer 3 to the extraordinary refractive index $n_e$ of the liquid crystal layer 3, and preferably, the refractive index of the grating unit 7 equals $n_o$. In practical applications, the period of one grating unit 7 is generally equal to a width of one pixel unit A.

Figure 5:
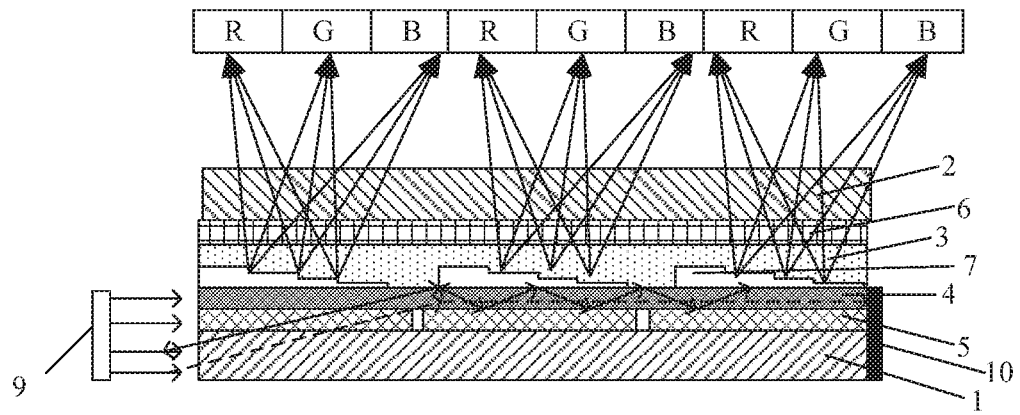
FIG. 5 is a schematic structural diagram of a display device according to the first and second embodiments of the present disclosure.

The grating unit 7 is an echelon grating (nanometer grating). A color in each pixel unit A is achieved by utilizing principles of interference and diffraction effect of the echelon grating, so that a diffraction optical device can realize color separation of the Fresnel diffraction field, and by choosing a proper grating height and phase distribution, such that red, green and blue rays of light are spatially separated effectively. Referring to FIG. 5, after light coupled out of the waveguide layer 4 passes through the grating unit, light having different wavelengths (e.g., red light, green light, and blue light) is emitted towards a display surface at different angles, so that effective color separation control is provided without providing a color film substrate and color display is achieved.

Figure 4:
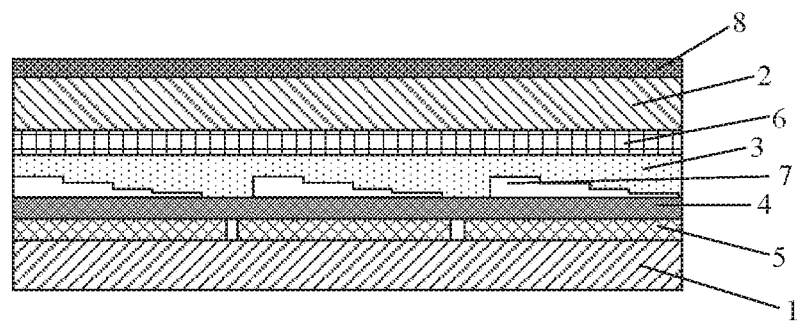
FIG. 4 is a schematic structural diagram of a display panel in the first embodiment of the present disclosure.

As shown in FIG. 4, the display panel further includes a scattering film 8 on a surface of the second substrate 2 distal to the liquid crystal layer 3. The scattering film 8 functions to scatter light having a small angle or a large angle that is coupled out of the waveguide layer 4 under the control of the grating unit 7, so as to improve the viewing angle of the display panel.

As a specific implementation in the embodiment, as shown in FIG. 1 or 5, in the display panel, the first electrode 5 is located on a side of the waveguide layer 4 proximal to the first substrate 1; the grating unit 7 is located on a side of the waveguide layer 4 distal to the first electrode 5; the liquid crystal layer 3 is located on a side of the grating unit 7 distal to the waveguide layer 4; and the second electrode 6 is located on a side of the second substrate 2 proximal to the liquid crystal layer 3.

Figure 6:
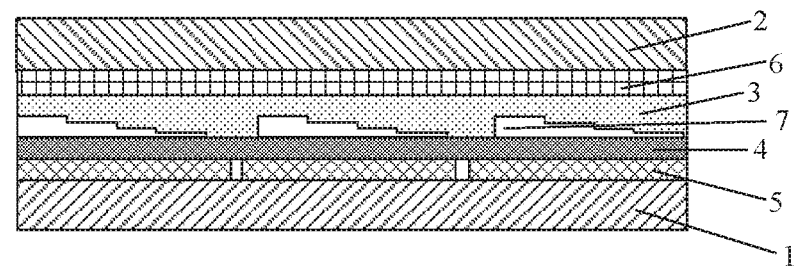
FIG. 6 is a schematic diagram of a display panel in L0 mode according to the first embodiment of the present disclosure.
Figure 7:
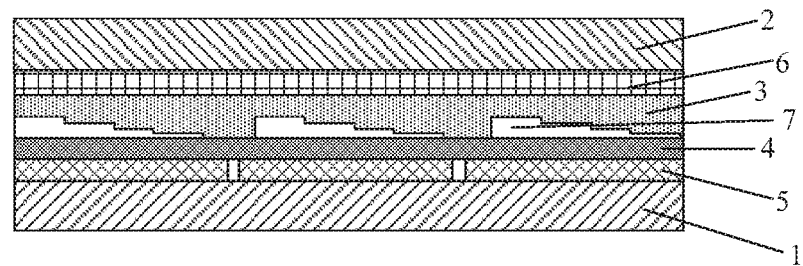
FIG. 7 is a schematic diagram of a display panel in L255 mode according to the first embodiment of the present disclosure.

Specifically, by adjusting the voltages applied to the first electrode 5 and the second electrode 6, rotation of a refractive index ellipsoid of the liquid crystal layer 3 in a cross section (principal plane) as shown in FIG. 6 can be realized, thereby realizing adjustment of the refractive index of the liquid crystal layer 3 between $n_o$ and $n_e$. When the refractive index of the liquid crystal layer 3 and the refractive index of the grating unit 7 are equal, the function of the grating unit 7 is disabled, and so no light is coupled out of the waveguide layer 4, and in this case, the display is in a constant black mode (L0 mode). As shown in FIG. 7, when the difference between the refractive indices of the liquid crystal layer 3 and the grating unit 7 is the largest, the grating unit 7 has the most obvious effect, the coupling efficiency at which light is coupled out from the waveguide layer 4 is the highest, and in this case, the display is in a constant white mode (L255 mode). When the refractive index of the liquid crystal layer 3 is between the values in the above two cases, the display is in a grayscale state other than the above two states. Since only polarized light (e light) whose vibration direction is in the cross section (principal plane) shown in FIG. 5 can be influenced by the change in the refractive index, whereas polarized light (o light) whose vibration direction is perpendicular to the principal plane cannot be influenced by the change in the refractive index, the light coupled out of the variable grating is polarized light (e light). For a typical liquid crystal material, an alignment film (in general, PI) needs to be provided on a lower surface (preferably, but not limited to, the lower surface) of the second electrode 6 to control initial alignment of liquid crystal molecules and ensure that the liquid crystal molecules can rotate as expected under an applied voltage to set the display mode to be either a constant black display mode or a constant white display mode.

Figure 8:
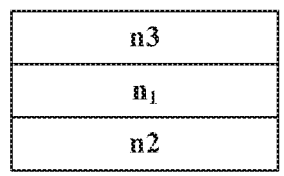
FIG. 8 is a schematic diagram of a planar waveguide of a display panel according to the first embodiment of the present disclosure.

Those skilled in the art could know that, as shown in FIG. 8, a planar waveguide is formed of three material layers, wherein the middle layer is a waveguide film having a refractive index of $n_1$ and deposited on a substrate having a refractive index of $n_2$, and a covering layer having a refractive index of $n_3$ is on the waveguide film. The waveguide film is typically has a micron-sized thickness, which is comparable to the wavelength of light. A difference between refractive indices of the waveguide film and the substrate is generally between $10^{-1}$ and $10^{-3}$. In order to form an authentic optical waveguide, $n_1$ must be greater than $n_2$ and $n_3$, that is, $n_1 > n_2 >= n_3$. In this way, light can be confined to propagate in the waveguide film.

Therefore, in this embodiment, the refractive index of the waveguide layer 4 is greater than the refractive index of the first electrode 5, and the refractive index of the first electrode 5 is greater than or equal to the refractive index of the grating unit 7, so as to realize a planar waveguide.

Figure 9:
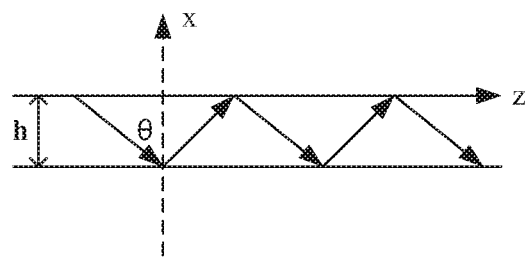
FIG. 9 is a schematic diagram showing propagation in a planar waveguide according to the first embodiment of the present disclosure.

As shown in FIG. 9, propagation of light in a planar waveguide can be considered as total reflection of light at the interface between the first electrode 5 and the waveguide layer 4, so that the light propagates along a zigzag path in the waveguide film. Light propagates in a zigzag pattern in the Z direction in the waveguide, the light is confined in the x direction but is not confined in the y direction.

In the planar waveguide, $n_1 > n_2$ and $n_1 > n_3$, when an incident angle $\theta_1$ of incident light exceeds the critical angle $\theta_0$:

$$\sin\theta_0 = \frac{n_2}{n_1};$$

the incident light is totally reflected, and at this time, a certain phase jump is produced at the reflection point. From Fresnel reflection formula:

$$R_{TE} = \frac{n_1\cos\theta_1 - \sqrt{n_2^2 - n_1^2\sin^2\theta_1}}{n_1\cos\theta_1 + \sqrt{n_2^2 - n_1^2\sin^2\theta_1}};$$

$$R_{TM} = \frac{n_2^2\cos\theta_1 - n_1\sqrt{n_2^2 - n_1^2\sin^2\theta_1}}{n_2^2\cos\theta_1 + n_1\sqrt{n_2^2 - n_1^2\sin^2\theta_1}},$$

we can derive the phase jumps $\phi_{TM}$, $\phi_{TE}$ at the reflection points are:

$$\tan\phi_{TE} = \frac{\sqrt{\beta^2 - k_0^2 n_2^2}}{\sqrt{k_0^2 n_1^2 - \beta^2}};$$

-continued $$\tan\phi_{TM} = \frac{n_1^2\sqrt{\beta^2 - k_0^2 n_2^2}}{n_2^2\sqrt{k_0^2 n_1^2 - \beta^2}};$$

where $\beta=k_0 n_1 \sin\theta 1$, $\beta$ is a propagation constant of light, $k_0=2\pi/\lambda$, $k_0$ is a wave number of light in vacuum, and $\lambda$ is the wavelength of light.

In order for light to propagate stably in a waveguide, the following equation needs to be satisfied:

$$2kh - 2\phi_{12} - 2\phi_{13} = 2m\pi, m=0,1,2,3\ldots;$$

where: $k=k_0 n_1 \cos\theta$, $\phi_{12}$ and $\phi_{13}$ are phase differences of total reflection, h is a thickness of the waveguide, m is a mode order, that is, a positive integer starting from zero. Therefore, only light having an incident angle satisfying the above equation can stably propagate in the optical waveguide.

Figure 10:
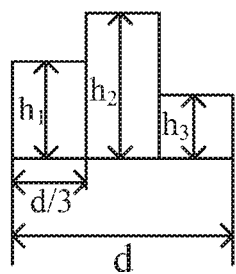
FIG. 10 is a schematic diagram of a grating unit of the display panel in the first embodiment of the present disclosure.

Specifically, in the embodiment, the number of the steps of a preferred echelon grating is 3 to 100; preferably, the number of steps is 3, that is, a three-order grating. As shown in FIG. 10, the third-order grating is configured to disperse light into light of three different colors, namely, red light, green light and blue light. The echelon grating has a width d (period) of 0.1 µm to 300 µm (the width of each step is d/3); each step in the echelon grating has a height ($h_1$, $h_2$, $h_3$) of 0 µm to 300 µm; and the echelon grating has an imaging distance of 2 µm to 20 µm. It should be noted that a thickness of the liquid crystal layer 3 needs to be greater than a height of the grating unit 7, and the imaging distance Z of the grating is generally greater than the thickness of the liquid crystal layer 3.

Z is the imaging distance, and according to a formula:

$$Z_T = \frac{\lambda}{1 - \sqrt{1 - \frac{\lambda^2}{a^2}}};$$

Figure 11:
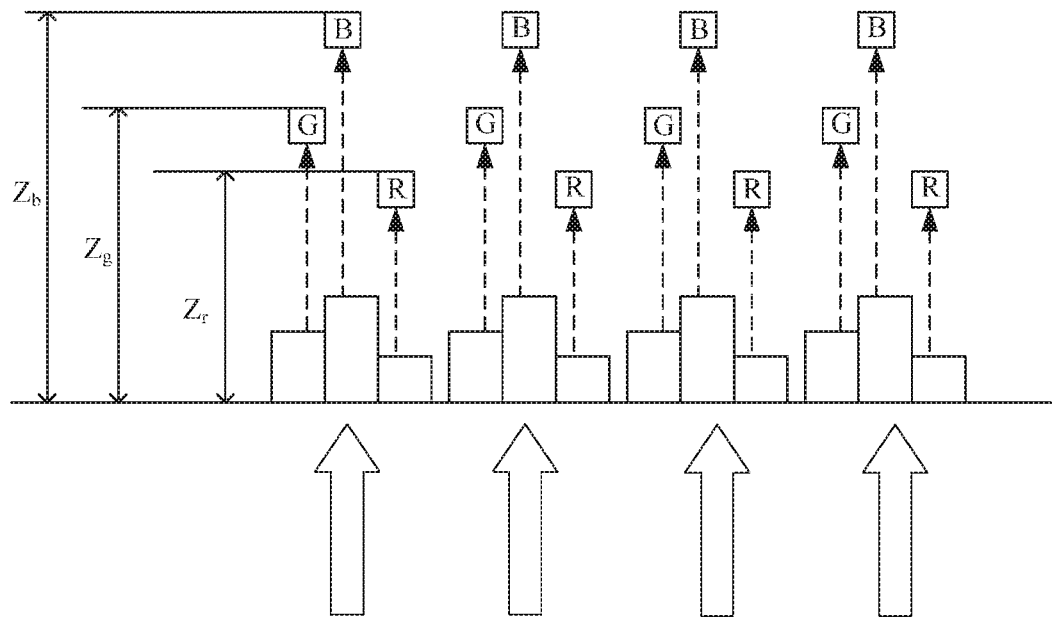
FIGS. 11 and 12 are schematic diagrams illustrating an imaging distance of the display panel in the first embodiment of the present disclosure.
Figure 12:
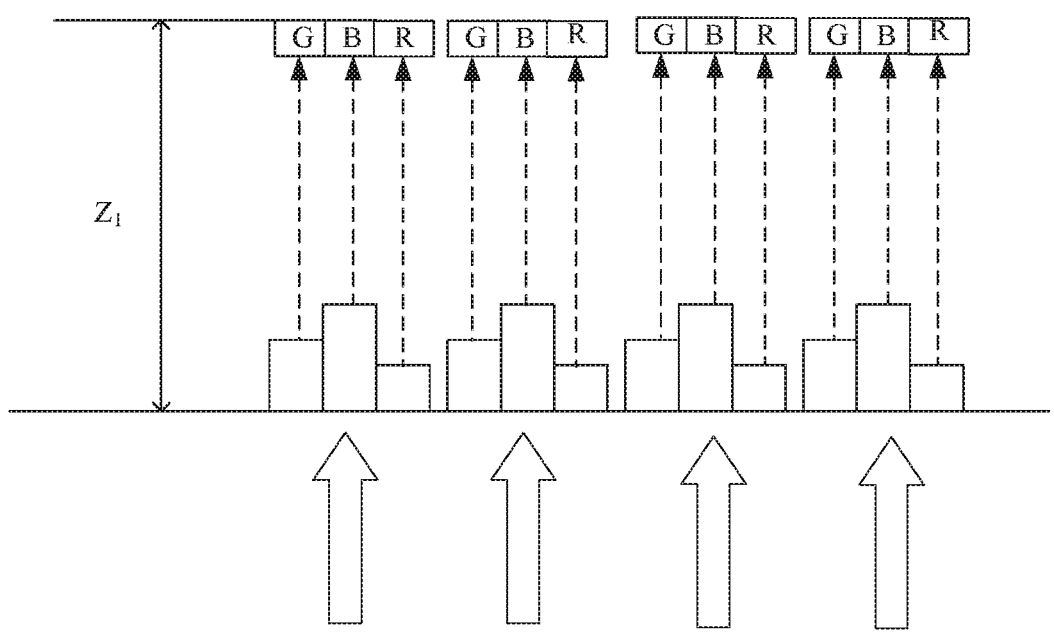

It can be known that the imaging distance $Z_T$ of the echelon grating is dependent on a wavelength $\lambda$ of incident light, a difference in refractive index (a fixed value), and a grating period a. Referring to FIG. 11, imaging distances corresponding to red light R, green light G and blue light B are $Z_r$, $Z_g$ and $Z_b$, respectively. In this case, the difference in refractive index among the steps of the grating unit 7 may be adjusted such that all of the imaging distances $Z_r$, $Z_g$ and $Z_b$ of red light R, green light G and blue light B are equal to $Z_1$, as shown in FIG. 12.

Transmittance of light of each color may be obtained according to the following formula:

$$Tr = \left[ rect\left(\frac{x_0 + d/3}{d/3}\right) * \exp(i\phi 1) + rect(3x_0/d)\exp(i\phi 2) + rect\left(\frac{x_0 - d/3}{d/3}\right) * \exp(i\phi 3) \right] * \frac{1}{d}comb\left(\frac{x_0}{d}\right)$$

$$\varphi = 2pi(n-1)H_i/\lambda;$$

$$i = 1, 2, 3$$

It can be known from the formula that, $T_r$ is the transmittance of light and dependent on the wavelength $\lambda$ of incident light, the grating period d, the height of the grating and the number of steps of the grating. Therefore, once the grating period d is fixed, the transmittance of each pixel can be controlled based on the number of steps and height of the grating.

Second Embodiment

As shown in FIG. 5, the present embodiment provides a display device, which includes a backlight 9 and a display panel in the first embodiment.

In this embodiment, the backlight 9 is an edge type backlight 9 for providing collimated (parallel) light. In practical applications, a backlight 9 in other form may also be used. For example, the backlight 9 may be a direct type backlight 9, which is not specifically illustrated.

The backlight 9 may include an LED light source or a light source of other form. A LED chip may include a blue LED or LED of other light having a shorter wavelength than blue light, and a light source in other form may be a laser light source. Optionally, in a case where the backlight 9 is a laser light source, a beam expanding structure may be further provided on a light exiting side of the backlight 9 (i.e., between the backlight 9 and the display panel), and the expanding structure can not only expand laser light, as a laser point light source, emitted by the laser light source to a collimated light source, but also increase a diameter of light beam.

The backlight 9 is provided at least correspondingly to the waveguide layer 4, and a light exiting direction of light from the backlight 9 is parallel to a plane where the waveguide layer 4 is located. As shown in FIG. 4, the backlight 9 is provided correspondingly to the first substrate 1, the waveguide layer 4 and the first electrode 5, and a width of the backlight 8 may be the sum of widths of the first substrate 1, the waveguide layer 4 and the first electrode 5. In practical applications, the backlight 9 may be set to have other width, but it is preferable that the backlight 9 does not emit light towards the liquid crystal layer 3 and layers above the liquid crystal layer. Since a sealant is provided on outer side of the liquid crystal layer 3, light emitted towards the liquid crystal layer 3 will not enter into the liquid crystal layer 3. Needless to say, the arrangement of the backlight 9 is not limited to the above arrangements, and the backlight 9 can be arranged in any manner as long as it can be ensured that light (incident light) emitted by the backlight 9 is totally reflected within the waveguide layer 4.

Optionally, light emitted from the backlight 9 is collimated light. In particular, when the backlight 9 is a laser light source, light emitted from the backlight 9 becomes collimated light because of the expanding structure.

Preferably, the display device further includes a light-shielding layer 10 on a side of the display panel away from the backlight 9, and the light-shielding layer 10 is configured to absorb light remaining in the waveguide layer 4 after the light emitted from the backlight 9 is coupled out of the waveguide layer 4 by the grating unit 7, so as to prevent light leak of the display device.

In this embodiment, the display device may be an ECB display device, a TN display device, a VA display device, an IPS display device, or an ADS display device.

It could be understood that the above embodiments are merely exemplary embodiments adopted for describing the principle of the present invention, but the present invention is not limited thereto. Various variations and improvements may be made by those of ordinary skill in the art without departing from the spirit and essence of the present invention, and these variations and improvements shall also be regarded as falling into the protection scope of the present invention.

The invention claimed is:

1. A display panel, comprising: a first substrate and a second substrate disposed opposite to each other; a liquid crystal layer, a first electrode, and a second electrode between the first substrate and the second substrate; a waveguide layer between the first substrate and the liquid crystal layer; and a plurality of grating units, which are combined with the liquid crystal layer and disposed in a same layer as the liquid crystal layer, wherein the first electrode and the second electrode are configured to adjust a refractive index of the liquid crystal layer by changing voltages applied thereto; and a coupling efficiency at which light is coupled out of the waveguide layer is determined according to a difference between a refractive index of the grating units and the refractive index of the liquid crystal layer, wherein the grating unit is an echelon grating, steps in the echelon grating have different heights from each other, and the grating unit is configured to perform color separation on light of different wavelengths through a stepped structure of the echelon grating.

2. The display panel of claim 1, wherein the grating unit is on a side of the liquid crystal layer proximal to the first substrate.

3. The display panel of claim 1, wherein the grating unit is on a side of the liquid crystal layer proximal to the second substrate.

4. The display panel of claim 1, wherein the first electrode and the second electrode are on one side of the liquid crystal layer.

5. The display panel of claim 1, wherein the first electrode and the second electrode are on different sides of the liquid crystal layer.

6. The display panel of claim 1, wherein the first electrode is on a side of the waveguide layer proximal to the first substrate; the grating unit is on a side of the waveguide layer distal to the first electrode; the liquid crystal layer is on a side of the grating unit distal to the waveguide layer; and the second electrode is on a side of the second substrate proximal to the liquid crystal layer.

7. The display panel of claim 6, wherein a refractive index of the waveguide layer is larger than a refractive index of the first electrode, and the refractive index of the first electrode is larger than or equal to the refractive index of the grating unit.

8. The display panel of claim 1, wherein the refractive index of the grating unit ranges from an ordinary refractive index $n_o$ of the liquid crystal layer to an extraordinary refractive index $n_e$ of the liquid crystal layer.

9. The display panel of claim 1, wherein the echelon grating has 3 to 100 steps; the echelon grating has a width of 0.1 μm to 200 μm; each step of the echelon grating has a height of 0 μm to 300 μm; and the echelon grating has an imaging distance of 2 μm to 20 μm.

10. The display panel of claim 9, wherein the echelon grating has 3 steps, and the echelon grating is configured to disperse light into red light, green light and red light.

11. The display panel of claim 1, wherein a material of the liquid crystal layer comprises any one of a nematic liquid crystal, a cholesteric liquid crystal and a blue phase liquid crystal.

12. The display panel of claim 1, further comprising a scattering film on a side of the second substrate distal to the liquid crystal layer.

13. A display device, comprising a backlight and the display panel of claim 1.

14. The display device of claim 13, wherein the backlight is an edge type backlight, and is configured to provide collimated light.

15. The display device of claim 14, further comprising a light-shielding layer on a side of the display panel distal to the backlight.

* * * * *